United States Patent [19]

Deckelmann et al.

[11] Patent Number: 5,038,210
[45] Date of Patent: Aug. 6, 1991

[54] TEST PATTERN SIGNAL GENERATOR FOR PRODUCING ZONE PLATE AND OTHER TEST PATTERNS

[75] Inventors: Winfried Deckelmann, Weiterstadt; Hans-Peter Richter, Gross-Bieberau; Stefan Ott, Ulm, all of Fed. Rep. of Germany

[73] Assignee: BTS Broadcast Television Systems GmbH, Darmstadt, Fed. Rep. of Germany

[21] Appl. No.: 639,104

[22] Filed: Jan. 9, 1991

[30] Foreign Application Priority Data

Jan. 9, 1990 [DE] Fed. Rep. of Germany ....... 4000359

[51] Int. Cl.$^5$ .................................................. H04N 17/02
[52] U.S. Cl. .................................. 358/139; 328/187; 328/188; 358/10
[58] Field of Search .................. 358/139, 10; 328/187, 328/188

[56] References Cited

U.S. PATENT DOCUMENTS

| | | | |
|---|---|---|---|
| 4,408,337 | 10/1983 | Cano | 358/139 |
| 4,855,826 | 8/1989 | Wischermann et al. | 358/10 |
| 5,003,393 | 3/1991 | Riegel | 358/139 |

Primary Examiner—Howard W. Britton
Attorney, Agent, or Firm—Frishauf, Holtz, Goodman & Woodward

[57] ABSTRACT

A test pattern generator for digital television signals produces a zone plate pattern on an orthogonal pixel raster generated by pixel and line counters. The counter outputs are supplied to respective ROMs each storing a parabolic function. Their outputs are added to define zone plate circles on the basis of the circle equation $x^2 = y^2 = r^2$. Circular patterns of evenly spaced color bars are produced by interposing a square root extracting ROM ahead of another ROM which converts the phase values into amplitude values. The optional interposition of a square root function after the addition and before the conversion into amplitude values provides a different circular test pattern. It can be readily modified in various ways under control of a microprocessor or EPROM.

7 Claims, 1 Drawing Sheet

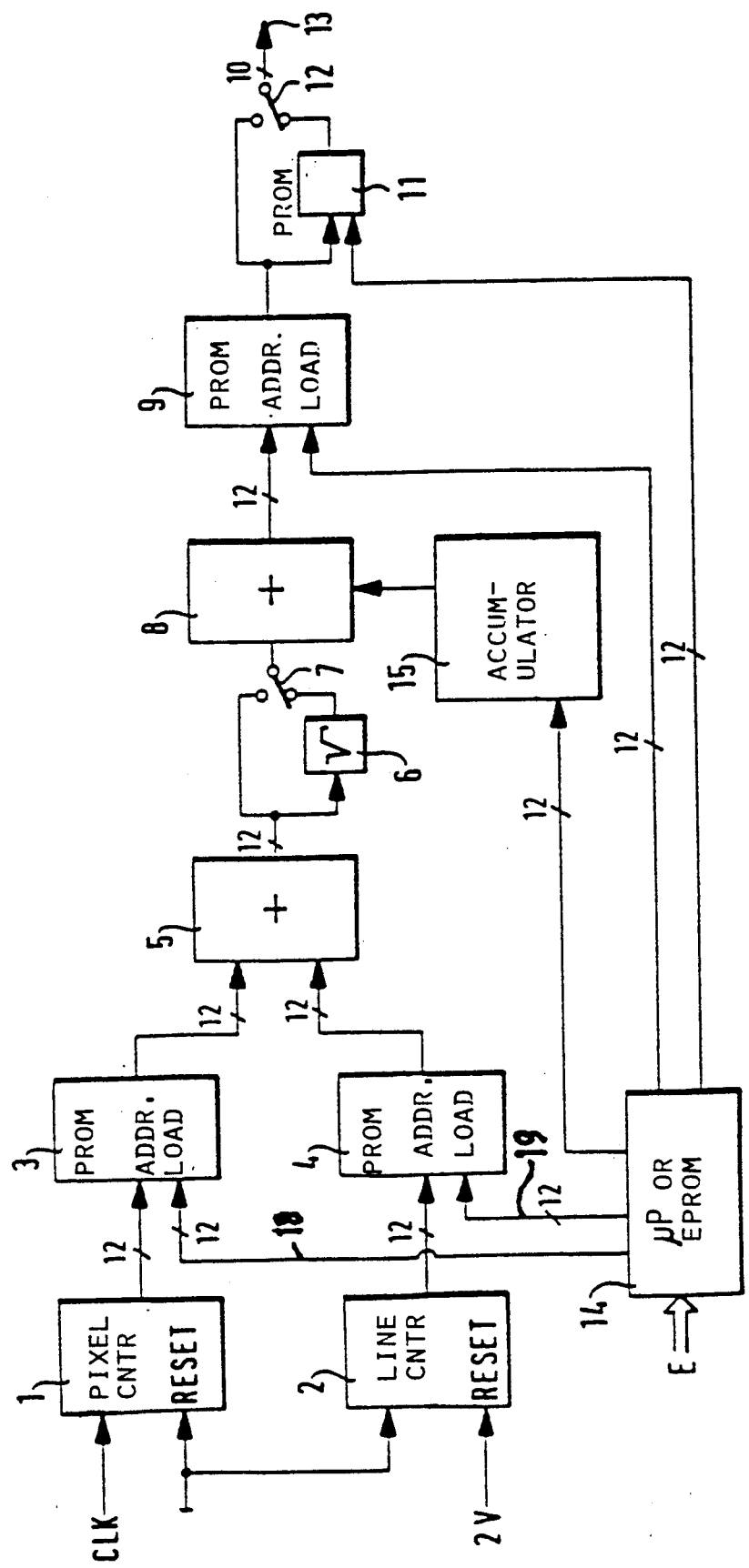

TEST PATTERN SIGNAL GENERATOR FOR PRODUCING ZONE PLATE AND OTHER TEST PATTERNS

This invention concerns a test pattern generator for testing digital television signals comprising horizontal pixel rate and vertical line rate counters for generation of an orthogonal pixel raster, first and second ROMs respectively connected to and addressable by the counters for respectively generating horizontal and vertical phase values, an addition stage connected to the respective outputs of the ROMs for combining their phase values and a third ROM for converting the combined phase values into amplitude values.

U.S. Pat. No. 4,855,826 shows a test pattern generator of that kind for generating a zone plate signal. The zone plate test pattern signal, however, has been found to be of limited value in testing digital television signals, although its utility is important enough not to be dispensed with.

SUMMARY OF THE INVENTION

It is an object of the present invention to provide a test pattern generator for digital television signals operating on the general principles of the zone plate pattern generator which is capable of providing a variety of test pattern configurations for testing digital television equipment.

Briefly, a fourth ROM which is addressable by the output of the addition stage that combines the phase values is provided for subjecting the combined phase values to square root extraction and switch means are provided for selecting for ultimate conversion into amplitude values either the direct output of the addition stage or the output of the fourth ROM. Thus, although a zone plate pattern is producible for test purposes, a similar pattern of a different distribution of zones and markers is possible.

A wider variety of test patterns can be made available, if the first, second and third ROMs are programmable and a second addition circuit is provided ahead of the third ROM for insertion of phase values that increase or decrease during each vertical blanking interval to produce a moving test pattern.

A microprocessor or an EPROM can control the loading of various contents in the ROMs and also control insertion of markers in the test pattern.

The invention has the advantage of providing a test pattern generator that is not limited to a zone plate test pattern and makes available a multiplicity of test patterns, some of which are quite complex, with little additional cost.

BRIEF DESCRIPTION OF THE DRAWINGS

The invention is further described by way of illustrative example with reference to the annexed drawing, the single FIGURE of which is a block circuit diagram of an illustrative embodiment of the invention.

DESCRIPTION OF THE ILLUSTRATIVE EMBODIMENT

The counter 1 shown in the drawing operates at the sampling rate of the digital or video signal, so that it counts picture elements (pixels). The counter 2 counts the lines of a television picture. As shown in the drawing, a clock signal CLK is supplied to the count input of the pixel counter 1 and a horizontal synchronizing signal is provided to the reset input of that counter. The horizontal synchronizing signal is also furnished to the count input of the line counter 2, while a reset input of the counter 2 is connected to a source of a signal 2V which occurs at the completion of each picture. The 12 bit output signals of the counters 1 and 2 make it possible to produce an orthogonal pixel raster.

A first ROM 3 is connected to be addressed by the output of the counter 1 and a second ROM 4 is connected to be addressed by the output of the counter 2. These ROMs are so programmed that they generate the phase values respectively of horizontal and vertical wobble signals for a zone plate test pattern. Because of the orthogonality of the pixel raster these phase values can be linearly superposed in a following addition stage 5. In consequence there is provided at the output of the addition stage 5 a signal having a phase value that rises quadratically because the ROMs 3 and 4 each store a parabolic function. An addition stage 5 is connected to following stages either directly or, according to the invention, through an additional ROM 6, by virtue of the selector switch 7. The ROM 6 is programmed to subject the input phase values by which it is addressed to a square root extraction, thus producing phase values rising linearly rather than quadratically.

In the position of the switch 7 shown in the drawing, the output signal of the addition stage 5 is supplied to the ROM 6 so as to provide, by the square root function, a signal of linearly rising phase value. Thus, for example, by means of the ROM 6 a round color bar configuration can be generated, while the ROMs 3 and 4 respectively store quadratic functions so that the equation of a circle $(x^2+y^2=r^2)$ is satisfied. In order to provide equidistant spacings of the individual color bars, the generated pixel pattern produced by the addition stage 5 must be subjected to square root extraction. In this manner any desired one-dimensional test pattern can be displayed in a circular form.

When the switch 7 is put into its other position, the phase values for a zone plate signal are transmitted to the following circuits. The addition stage 8 which follows the switch 7 in the illustrated embodiment provides a possibility of feeding in temporary values to be superimposed, for example a time-wise wobble signal or a constant movement-frequency signal.

The output of the second addition stage 8 is connected to the address inputs of still another ROM 9 storing a sine function for converting the phase values into amplitude values of a wobble signal. The output of the ROM 9 is then supplied either directly or by way of another ROM 11 to the test pattern generator output 13. The ROM 11 serves for generating markers to be inserted or faded into the test pattern signal. The purpose and nature of these markers are described in the above-mentioned U.S. Pat. No. 4,855,826 and do not need to be referred to further here. A switch 12, having its selector contact connected to the test pattern generator output 13 is provided for selecting either the direct output from the ROM 9 or the output which is processed by the provision of the ROM 11.

In order to make possible the generation and representation of a variety of test signals, it is convenient to provide a microprocessor 14 or an EPROM memory, controllable from a keyboard (not shown) over an input bus E for loading various characteristic curves into the ROM 9, which then needs to be programmable, in order to provide different kinds of conversion of phase values into wave or "wobble" amplitude values, and/or to control the addition or subtraction of a fixed amount of phase value at each vertical blanking interval to produce a moving pattern by means of the addition circuit 8 and/or to control the ROM 11 which generates and inserts marker signals. The unit 15 controllable by the microprocessor or EPROM 14 for supplying an increment or decrement at the time of vertical blanking intervals. The unit 15 is essentially an accumulator unit for producing a steady movement of a circular or elliptical pattern away from the center or towards the center, or to move a horizontal, vertical or oblique color bar pattern transversely of the color bars.

It is also useful for the ROMs 3 and 4 to be electronically programmable for loading them with different tables by the microprocessor 14, as shown by the connections 18 and 19 in the drawing. In that case, the parabolic tables used to produce phase values that increase quadratically can simply be replaced selectively by other tables to provide linear phase progressions, or any of a variety of complex phase progressions, suitable for generating test patterns of different configurations. In these cases the square root ROM 6 is not used and, if present, is bypassed.

Programmable (EPROM) ROMs 3 and 4 can be loaded with various kinds of quadratic functions to produce elliptic patterns or the like. If they are loaded with linear functions, diagonal, horizontal or vertical bar patterns can be produced. In these cases also, the ROM 6 is not used and, if present, is bypassed.

Although the invention has been described with reference to particular illustrative embodiments, it will be understood that variations and modifications are possible within the inventive concept.

We claim:

1. A test pattern generator for testing digital television signals which is capable of providing a circular zone plate pattern signal as well as other test pattern signals, comprising horizontal pixel rate and vertical line rate counters (1, 2) for generation of an orthogonal pixel raster, first and second ROMs (3, 4), each having an output and respectively connected to and addressable by said counters for respectively generating horizontal and vertical phase values, an addition stage (5) connected to the respective outputs of said ROMs for combining said phase values and a third ROM (9), connected for receiving phase values from said addition stage and having an output, for converting said combined phase values into amplitude values and further comprising:
   a fourth ROM (6), connected to and addressable by the output of said addition stage (5) and having an output, for subjecting said combined phase values to square root extraction to produce modified phase values, and
   switch means connected to said addition stage (5) and to said fourth ROM (6) and connected for selecting, for ultimate conversion into amplitude values by said third ROM (9), either the output of said addition stage (5) or the output of said fourth ROM (6).

2. The test pattern generator of claim 1, wherein said third ROM (9) is programmable and further comprising a microprocessor (14) connected for loading said programmable third ROM (9) with any of a plurality of selectable characteristic curves for conversion of combined phase values into amplitude values.

3. The test pattern generator of claim 1, further comprising a microprocessor (14), an accumulator (15) and a second addition stage (8) which is interposed between said switch means (7) and said third ROM (9) and which has one input connected to said switch means, another input connected to said microprocessor through said accumulator and an output connected to said third ROM (9), said microprocessor being programmed and connected for supplying to said second addition stage (8), through said accumulator, controllable values having variations that occur only within a vertical blanking interval for producing the effect of a moving test pattern.

4. The test pattern generator of claim 1, further comprising a fifth ROM (11) which is connected to the output of said third ROM (9) for insertion of markers in the output of said third ROM and means (12, 14) for controlling the insertion of markers in test patterns generated by said test pattern generator.

5. A test pattern generator for testing digital television signals according to the zone plate pattern generation principle for generating a variety of test pattern signals, comprising horizontal pixel rate and vertical line rate counters (1, 2) for generation of an orthogonal pixel raster, first and second programmable ROMs (3, 4), each having an output and respectively connected to and addressable by said counters for respectively generating horizontal and vertical phase values, an addition stage (5) connected to the respective outputs of said ROMs for combining said phase values and a third ROM (9), connected for receiving phase values from said addition stage and having an output, for converting said combined phase values into cyclical amplitude values and further comprising:
   a microprocessor (14) having outputs respectively connected to said first and second ROMs (3, 4) and being programmed for selectively loading into said first and second ROMs any of a plurality of mutually corresponding functions, whereby a variable scan raster is made available at the output of said addition stage 5 for generating a test pattern signal at the output of said third ROM (9).

6. The test pattern generator of claim 5, wherein said third ROM (9) is programmable and wherein said microprocessor is (14) connected and programmed for loading said programmable third ROM (9) with any of a plurality of selectable characteristic curves for conversion of combined phase values into amplitude values.

7. The test pattern generator of claim 5, further comprising an accumulator (15) and a second addition stage (8) which is interposed between said switch means (7) and said third ROM (9) and which has one input connected to said switching means, another input connected to said microprocessor (14) through said accumulator (15) and an output connected to said third ROM (9), said microprocessor being programmed and connected for supplying to said second addition stage (8), through said accumulator, controllable values having variations that occur only within a vertical blanking interval for producing the effect of a moving test pattern.

* * * * *